J. A. FULTON.
ATTACHMENT FOR HOSE.
APPLICATION FILED SEPT. 10, 1919.

1,363,967.

Patented Dec. 28, 1920.

WITNESSES
William Meyer
S. W. Foster

INVENTOR
J. A. Fulton
BY
ATTORNEYS

UNITED STATES PATENT OFFICE.

JACOB A. FULTON, OF ASTORIA, OREGON.

ATTACHMENT FOR HOSE.

1,363,967.

Specification of Letters Patent.　Patented Dec. 28, 1920.

Application filed September 10, 1919.　Serial No. 322,789.

*To all whom it may concern:*

Be it known that I, JACOB A. FULTON, a citizen of the United States, and a resident of the city of Astoria, in the county of Clatsop and State of Oregon, have invented new and Improved Attachments for Hose, of which the following is a full, clear, and exact description.

This invention relates to improvements in attachments for hose, an object of the invention being to provide an attachment for garden hose which takes the place of an ordinary nozzle, and which permits a spray or stream of any kind to be directed from the hose and which forms a brace for a short length of the hose to permit the ready manipulation thereof.

A further object is to provide an attachment of the character stated which is much cheaper than a nozzle, which performs the function of a nozzle, and which, in addition, may be utilized to support the hose in position to direct a stream or spray as desired.

With these and other objects in view, the invention consists in certain novel features of construction and combinations and arrangements of parts as will be more fully hereinafter described and pointed out in the claims.

Figure 1:
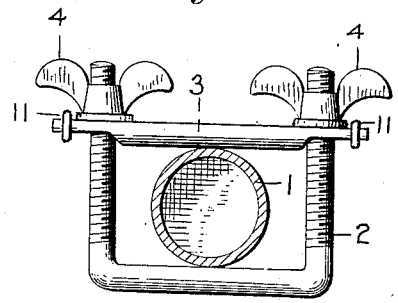
Figure 1 is an end view illustrating my improvements.
Figure 2:
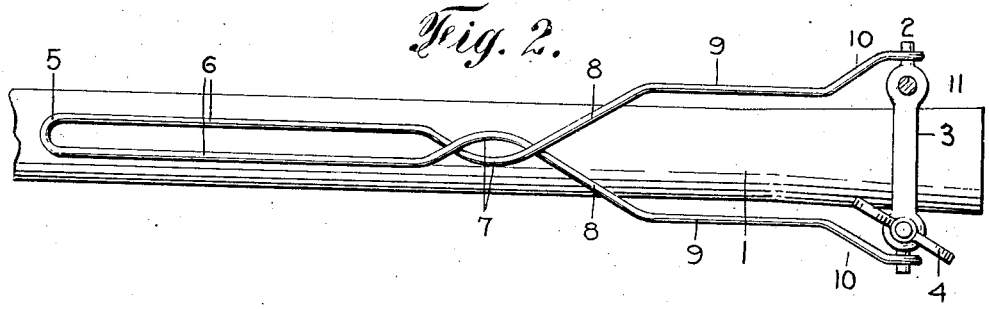
Fig. 2 is a plan view.

1 represents an ordinary garden hose around which a U-bolt 2 is positioned. 3 is an apertured bar receiving the U-bolt and adapted to compress the hose 1 when wing nuts 4 are screwed down against the bar and on the ends of the U-bolt.

A brace 5 is adapted to strengthen a short length of hose and this brace is preferably of spring wire bent midway its ends and extending parallel and relatively close together for a distance, as shown at 6, 6. The ends of the wire are then twisted as shown at 7, and are then flared outwardly as shown at 8. The ends of the wire then extend parallel to each other as shown at 9 and are spaced a distance apart greater than the diameter of the hose 1.

The ends of the wire are then laterally offset as shown at 10 and provided with eyes or hooks 11 at their ends receiving the ends of the apertured bar.

This brace may be located against the hose so that when gripped by the hand a relatively stiff portion will be provided to facilitate the manipulation of the stream or spray.

Figure 3:
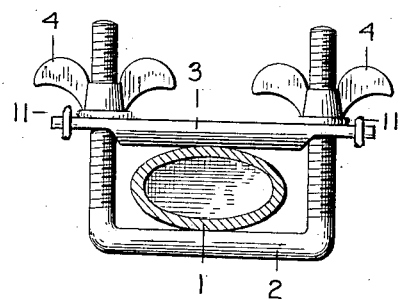
Fig. 3 is a view similar to Fig. 1 showing the hose compressed.

The stream or spray desired is had by tightening the nuts 4 to compress or flatten the outlet end of a hose, as indicated in Fig. 3 and when the end of the hose splits or frays, it can be cut off and the attachment moved back.

Figure 4:
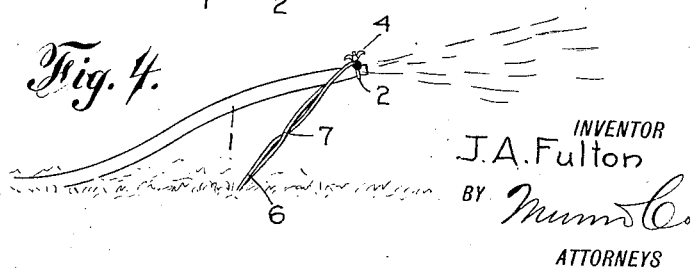
Fig. 4 is a view in elevation showing the hose supported on the ground.

The brace 5 may be used to support the hose on the ground as shown in Fig. 4 and when in this position the hose is projected between the portions 9, 9, of the brace and the end of the brace may be stuck in the ground if desired.

Various slight changes might be made in the general form of the parts described without departing from my invention, and hence I do not limit myself to the precise details set forth but consider myself at liberty to make such slight changes and alterations as fairly fall within the spirit and scope of the appended claims.

I claim:

1. An attachment of the character described, comprising hose clamping means, and a wire brace connected to the hose clamping means and adapted to be positioned beside the hose to stiffen the latter or be positioned at an angle to the hose to support the same.

2. An attachment of the character described, comprising a U-bolt, an apertured bar on the U-bolt, nuts on the ends of the U-bolt, a wire brace having eyes at its ends receiving the ends of said apertured bar, said bolt and bar adapted to compress a hose, and said brace adapted to stiffen the hose.

JACOB A. FULTON.